US012630048B2

(12) United States Patent
Asakura et al.

(10) Patent No.: US 12,630,048 B2
(45) Date of Patent: May 19, 2026

(54) ELECTRICAL GRID SYSTEM

(71) Applicant: Prime Planet Energy & Solutions, Inc., Tokyo (JP)

(72) Inventors: Jun Asakura, Kakogogawa (JP); Hideki Sakata, Nishinomiya (JP); Yutaka Yamauchi, Himeji (JP); Hideyuki Nagai, Nagoya (JP); Yasuhiko Ikeda, Kobe (JP); Masanori Iechika, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 839 days.

(21) Appl. No.: 17/935,576

(22) Filed: Sep. 27, 2022

(65) Prior Publication Data

US 2023/0095670 A1 Mar. 30, 2023

(30) Foreign Application Priority Data

Sep. 29, 2021 (JP) ................................. 2021-159420

(51) Int. Cl.
*B60L 55/00* (2019.01)
*B60L 53/53* (2019.01)
(Continued)

(52) U.S. Cl.
CPC ............... *B60L 55/00* (2019.02); *B60L 53/63* (2019.02); *B60L 53/68* (2019.02); *B60L 58/12* (2019.02);
(Continued)

(58) Field of Classification Search
CPC ......... H02J 3/322; H02J 7/0048; B60L 55/00; B60L 53/63; B60L 53/68; B60L 58/12
(Continued)

(56) References Cited

U.S. PATENT DOCUMENTS 7,847,518 B2 * 12/2010 Ichikawa ................ B60L 53/66
320/109
8,698,642 B2 * 4/2014 Taguchi .................... B60L 3/12
340/636.11

(Continued)

FOREIGN PATENT DOCUMENTS

JP 5529894 B2 6/2014
JP 202042686 A 3/2020

(Continued)

*Primary Examiner* — John T Trischler
(74) *Attorney, Agent, or Firm* — HAUPTMAN HAM, LLP

(57) ABSTRACT

An electrical grid system includes: a first obtaining controller that obtains the electric power demand or supply request information from the electric power transmission and distribution facility; a second obtaining controller that obtains an electric storage state information; a third obtaining controller that obtains a vehicle information of an electric vehicle; a supply and demand satisfaction level calculation controller that calculates a supply and demand satisfaction level based on the electric power demand or supply request information; a selection controller that selects an electric vehicle to be guided to the charge or discharge spot based on the vehicle information obtained by the third obtaining controller and the supply and demand satisfaction level calculated by the supply and demand satisfaction level calculation controller; and a communication controller that sends a guide information to the selected electric vehicle.

12 Claims, 5 Drawing Sheets

(51) Int. Cl.

| | |
|---|---|
| ***B60L 53/63*** | (2019.01) |
| ***B60L 53/68*** | (2019.01) |
| ***B60L 58/12*** | (2019.01) |
| ***H02J 3/32*** | (2006.01) |
| ***H02J 7/82*** | (2026.01) |
| *B60L 53/54* | (2019.01) |
| *B60L 53/55* | (2019.01) |
| *B60L 53/56* | (2019.01) |
| *B60L 53/66* | (2019.01) |
| *B60L 53/67* | (2019.01) |
| *G06Q 50/06* | (2012.01) |
| *H02J 3/17* | (2026.01) |
| *H02J 7/40* | (2026.01) |
| *H02J 7/42* | (2026.01) |
| *H02J 105/37* | (2026.01) |

(52) U.S. Cl.
CPC ................ *H02J 3/322* (2020.01); *H02J 7/82* (2026.01); *B60L 53/53* (2019.02); *B60L 53/54* (2019.02); *B60L 53/55* (2019.02); *B60L 53/56* (2019.02); *B60L 53/66* (2019.02); *B60L 53/67* (2019.02); *G06Q 50/06* (2013.01); *H02J 3/17* (2026.01); *H02J 7/40* (2026.01); *H02J 7/42* (2026.01); *H02J 2105/37* (2026.01); *Y02T 10/7072* (2013.01); *Y02T 90/12* (2013.01); *Y02T 90/14* (2013.01); *Y02T 90/167* (2013.01); *Y04S 10/126* (2013.01)

(58) Field of Classification Search
USPC .......................................................... 320/109
See application file for complete search history.

(56) References Cited

U.S. PATENT DOCUMENTS

| | | | | |
|---|---|---|---|---|
| 8,798,830 | B2 * | 8/2014 | Sobue | B60L 15/2045<br>701/22 |
| 9,126,493 | B2 * | 9/2015 | Suganuma | B60L 53/30 |
| 9,153,966 | B2 * | 10/2015 | Ishida | G07F 15/008 |
| 9,238,410 | B2 * | 1/2016 | Nakagawa | B60L 53/14 |
| 9,315,108 | B2 * | 4/2016 | Yokoyama | B60L 58/13 |
| 9,387,772 | B2 * | 7/2016 | Usuki | H01M 10/44 |
| 9,881,286 | B2 * | 1/2018 | Naito | B60L 53/68 |
| 10,661,676 | B2 * | 5/2020 | Takatsuka | G06Q 30/0645 |
| 10,814,732 | B2 * | 10/2020 | Ellgas | G05B 19/042 |
| 10,829,001 | B2 * | 11/2020 | Mizutani | B60L 53/65 |
| 10,906,422 | B2 * | 2/2021 | Ando | G01C 21/3469 |
| 11,139,667 | B2 * | 10/2021 | Esaka | H02J 3/32 |
| 11,285,837 | B2 * | 3/2022 | Muramatsu | B60L 53/665 |
| 11,376,979 | B2 * | 7/2022 | Chakraborty | B60L 53/36 |
| 11,458,857 | B2 * | 10/2022 | Sadano | B60L 50/64 |
| 11,618,335 | B2 * | 4/2023 | Kitaoka | B60L 53/53<br>320/134 |
| 11,624,619 | B2 * | 4/2023 | Nakamura | B60Q 9/00<br>701/428 |
| 11,731,524 | B2 * | 8/2023 | Martin | G01R 31/382<br>320/109 |
| 11,772,512 | B2 * | 10/2023 | Hashimoto | H01M 10/48<br>307/10.1 |
| 11,823,222 | B2 * | 11/2023 | Yamauchi | H02J 7/0063 |
| 11,955,616 | B2 * | 4/2024 | Tsuchiya | B60L 53/53 |
| 11,993,172 | B2 * | 5/2024 | Ogawa | B60L 53/63 |
| 12,036,889 | B2 * | 7/2024 | Sato | B60L 53/57 |
| 12,065,056 | B2 * | 8/2024 | Orihashi | B60L 55/00 |
| 12,083,917 | B2 * | 9/2024 | Mori | G06Q 50/06 |
| 12,194,880 | B1 * | 1/2025 | Yang | B60L 53/67 |
| 12,212,139 | B2 * | 1/2025 | Nakamura | B60L 53/63 |
| 12,227,101 | B2 * | 2/2025 | Matsuda | B60L 53/14 |
| 2009/0315512 | A1 * | 12/2009 | Ichikawa | B60L 50/61<br>320/109 |
| 2011/0032110 | A1 * | 2/2011 | Taguchi | B60L 3/12<br>340/636.1 |
| 2011/0202221 | A1 * | 8/2011 | Sobue | B60K 16/00<br>701/22 |
| 2012/0166012 | A1 * | 6/2012 | Lee | B60L 53/66<br>700/297 |
| 2012/0249068 | A1 | 10/2012 | Ishida | |
| 2012/0306446 | A1 * | 12/2012 | Suganuma | B60L 53/30<br>701/119 |
| 2013/0076296 | A1 * | 3/2013 | Ushiroda | B60L 53/38<br>320/109 |
| 2013/0289821 | A1 * | 10/2013 | Nakagawa | B60L 53/65<br>701/1 |
| 2013/0346308 | A1 * | 12/2013 | Naito | B60L 53/68<br>705/41 |
| 2014/0191722 | A1 * | 7/2014 | Usuki | B60L 53/63<br>320/109 |
| 2016/0009188 | A1 * | 1/2016 | Yokoyama | B60L 1/003<br>701/1 |
| 2016/0185246 | A1 * | 6/2016 | Paul | B60L 53/65<br>320/106 |
| 2018/0241229 | A1 * | 8/2018 | Kitaoka | B60L 53/63 |
| 2018/0361869 | A1 * | 12/2018 | Ellgas | B60L 53/65 |
| 2019/0023138 | A1 * | 1/2019 | Takatsuka | G06Q 50/40 |
| 2019/0118665 | A1 * | 4/2019 | Mizutani | B60L 53/67 |
| 2019/0139162 | A1 * | 5/2019 | Sawada | B60L 53/60 |
| 2019/0170526 | A1 * | 6/2019 | Ando | G01C 21/3469 |
| 2020/0091752 | A1 | 3/2020 | Esaka et al. | |
| 2020/0198493 | A1 * | 6/2020 | Muramatsu | H02J 13/00032 |
| 2020/0231056 | A1 | 7/2020 | Sadano et al. | |
| 2020/0262305 | A1 * | 8/2020 | Chakraborty | B60L 53/57 |
| 2020/0376972 | A1 * | 12/2020 | Martin | B60L 53/57 |
| 2021/0003408 | A1 * | 1/2021 | Nakamura | B60Q 9/00 |
| 2021/0053459 | A1 * | 2/2021 | Tsuchiya | H01M 10/441 |
| 2021/0162874 | A1 * | 6/2021 | Lee | H02J 7/0048 |
| 2021/0261014 | A1 * | 8/2021 | Iwata | H02J 13/00004 |
| 2021/0300202 | A1 * | 9/2021 | Ogawa | B60L 53/63 |
| 2021/0320503 | A1 * | 10/2021 | Kitaoka | B60L 53/63 |
| 2021/0339650 | A1 * | 11/2021 | Hashimoto | B60L 50/60 |
| 2021/0376402 | A1 * | 12/2021 | Tsuchiya | B60L 53/66 |
| 2021/0379999 | A1 * | 12/2021 | Yang | B60L 58/13 |
| 2022/0032898 | A1 * | 2/2022 | Miyazato | B60W 30/182 |
| 2022/0048403 | A1 * | 2/2022 | Sato | B60W 60/0025 |
| 2022/0239101 | A1 * | 7/2022 | Nakamura | B60L 53/65 |
| 2022/0242271 | A1 * | 8/2022 | Orihashi | B60L 53/63 |
| 2022/0289065 | A1 * | 9/2022 | Matsuda | B60L 53/14 |
| 2022/0332216 | A1 * | 10/2022 | Sakata | B60L 55/00 |
| 2023/0013447 | A1 * | 1/2023 | Yamauchi | G06Q 10/06315 |
| 2023/0014378 | A1 * | 1/2023 | Ciesco | B60L 58/16 |
| 2023/0018467 | A1 * | 1/2023 | Hoki | B60L 53/63 |
| 2023/0055841 | A1 * | 2/2023 | Mori | G06Q 50/06 |
| 2023/0061632 | A1 * | 3/2023 | Tabata | B60L 53/62 |
| 2023/0064812 | A1 * | 3/2023 | Dow | B60L 55/00 |
| 2023/0070376 | A1 * | 3/2023 | Sakata | B60L 53/67 |
| 2023/0094931 | A1 * | 3/2023 | Asakura | B60L 53/66<br>320/109 |
| 2023/0096126 | A1 * | 3/2023 | Saito | G06Q 30/0283<br>700/295 |
| 2023/0116812 | A1 * | 4/2023 | Yamauchi | H02J 7/0063<br>705/14.17 |
| 2023/0191941 | A1 * | 6/2023 | Naito | B60L 53/53<br>701/22 |
| 2023/0208173 | A1 * | 6/2023 | Iechika | H02J 13/00<br>700/295 |
| 2023/0219447 | A1 * | 7/2023 | Ehara | B60L 53/68 |
| 2023/0226939 | A1 * | 7/2023 | Ehara | B60L 53/62<br>320/109 |
| 2023/0234465 | A1 * | 7/2023 | Kubota | B60L 55/00<br>701/22 |
| 2023/0268736 | A1 * | 8/2023 | Saito | H02J 3/008<br>323/318 |
| 2023/0278451 | A1 * | 9/2023 | Ehara | B60L 53/62<br>320/109 |
| 2023/0281733 | A1 * | 9/2023 | Nakamura | G06Q 50/06<br>700/287 |
| 2023/0289760 | A1 * | 9/2023 | Saito | G07F 15/008 |
| 2024/0067009 | A1 * | 2/2024 | Kobuna | B60L 53/66 |
| 2024/0097441 | A1 * | 3/2024 | Horii | H02J 3/00 |
| 2024/0116477 | A1 * | 4/2024 | Terasawa | B60S 5/06 |

(56) References Cited

U.S. PATENT DOCUMENTS

| | | | | |
|---|---|---|---|---|
| 2024/0166074 A1* | 5/2024 | Kakuchi | ................. | B60L 53/65 |
| 2024/0166079 A1* | 5/2024 | Tomita | ..................... | B60L 53/66 |
| 2024/0249627 A1* | 7/2024 | Aoki | ........................ | B60L 53/66 |
| 2024/0262244 A1* | 8/2024 | Iwahori | .................... | B60L 58/14 |

FOREIGN PATENT DOCUMENTS

| | | | |
|---|---|---|---|
| JP | 2020-115704 | A | 7/2020 |
| JP | 6783196 | B2 | 11/2020 |
| JP | 2021-018608 | A | 2/2021 |
| WO | 2011/077780 | A1 | 6/2011 |

* cited by examiner

ELECTRICAL GRID SYSTEM

CROSS REFERENCE TO RELATED APPLICATIONS

The present application claims priority from Japanese Patent Application No. 2021-159420 filed on Sep. 29, 2021, which is incorporated by reference herein in its entirety.

BACKGROUND

A technique herein disclosed relates to an electrical grid system and an electric power demand and supply adjusting method with the electrical grid system.

Recently, an electric power demand and supply adjusting method is proposed in which a general user cooperates for adjusting an electric power demand and supply balance of an electric power transmission and distribution facility managed by an electric power company, or the like, and in which a certain incentive (money, point, or the like) is imparted in return. In the electric power demand and supply adjusting method as described above, when the electric power transmission and distribution facility lost the electric power demand and supply balance, a request for an electric power demand or supply is notified to a user who has a storage battery capable of repeatedly charging and discharging. When responding to the request described above, the user connects the storage battery owned by the user to an electric power demand and supply management apparatus, or the like, so as to perform an electric power demand and supply between the storage battery and the electric power transmission and distribution facility via the electric power demand and supply management apparatus. Then, the electric power demand and supply management apparatus described above imparts an incentive to the user based on an electric power demand or supply amount.

An example of the above-described electric power demand and supply management apparatus is disclosed in Japanese Patent Application Publication No. 2020-42686. The electric power demand and supply management apparatus described in Japanese Patent Application Publication No. 2020-42686 includes a state information obtaining controller that obtains a state information representing a current state of the storage battery, a performance calculation controller that calculates a performance indicator (a degradation degree of the storage battery) representing an exhaustion extent of the storage battery from the state information, and an incentive imparting part that imparts an incentive based on a value of the performance indicator to a provider who provides the storage battery as an electric power demand and supply adjusting means of the electric power transmission and distribution system. The electric power demand and supply management apparatus described above imparts a higher incentive to a user who possesses a storage battery in which a degradation degree of the storage battery is higher. By doing this, it is possible to encourage a user to participate in the electric power demand and supply adjustment, who hesitates to participate in the electric power demand and supply adjustment since being afraid of degradation, or the like, of the storage battery.

In addition, Japanese Patent No. 5529894 discloses a content of including a charge or discharge spot, a data center, and a power aggregator, and discloses a content in which the power aggregator makes ranking about an extent of necessity for performing charge or discharge on the storage battery of each electric vehicle based on a current position information and charge state information of the electric vehicle, and a position information of the charge or discharge spot, so as to make a ranking list that shows the ranking. Then, it is disclosed that the power aggregator guides the electric vehicle during movement to the charge or discharge spot according to the ranking list.

SUMMARY

However, the techniques described in Japanese Patent Application Publication No. 2020-42686 and Japanese Patent No. 5529894 are techniques that encourage to participate in the electric power demand and supply adjustment based on only an information of the electric vehicle including the storage battery, such as a performance indicator of the storage battery and a physical distance between the charge or discharge spot and the electric vehicle, but an electric power demand and supply state of the electric power transmission and distribution facility and an electric storage state of the charge or discharge spot are not examined.

The present disclosure has been made in view of the above-described circumstances, and an object of the present disclosure is to provide an electrical grid system that adjusts the electric storage state of the charge or discharge spot to promptly correspond to the electric power demand or supply request from the electric power transmission and distribution facility. In addition, another object is to provide an electric power demand and supply adjusting method with the electrical grid system described above.

In order to implement the above-described purpose, a herein disclosed electrical grid system is provided. The herein disclosed electrical grid system includes a first obtaining controller, a second obtaining controller, a third obtaining controller, a supply and demand satisfaction level calculation controller, a selection controller, and a communication controller. Said first obtaining controller is configured to obtain an electric power demand or supply request information from an electric power transmission and distribution facility. Said second obtaining controller is configured to obtain an electric storage state information from a charge or discharge spot at which an electric storage apparatus is disposed. Said third obtaining controller is configured to obtain a vehicle information of an electric vehicle that is electrically connected to said electric storage apparatus and is capable of performing charge or discharge. Said supply and demand satisfaction level obtaining controller is configured to calculate a supply and demand satisfaction level, based on said electric power demand or supply request information obtained by said first obtaining controller and said electric storage state information obtained by said second obtaining controller. Said selection controller is configured to select an electric vehicle to be guided to said charge or discharge spot, based on said vehicle information obtained by said third obtaining controller and said supply and demand satisfaction level calculated by said supply and demand satisfaction level calculation controller. Said communication controller is configured to send a guide information to said selected electric vehicle. Here, said electric power demand or supply request information is an information representing an electric power supply request amount or an electric power demand request amount, and said electric storage state information is an information representing an electric storage amount and free capacities of said charge or discharge spot.

According to the configuration described above, the supply and demand satisfaction level of the charge or discharge spot with respect to the electric power demand or supply request of the electric power transmission and distribution facility is calculated on the basis of the electric power demand or supply request information of the electric power transmission and distribution facility and the electric storage state information of the charge or discharge spot provided with the storage battery. Then, based on the supply and demand satisfaction level and the vehicle information of the electric vehicle that can perform charge or discharge at the charge or discharge spot, the electric vehicle is guided to the charge or discharge spot. By doing this, it is possible to suitably adjust the electric storage state of the charge or discharge spot and it is possible to promptly correspond to the electric power demand or supply request from the electric power transmission and distribution facility. Therefore, it is possible to implement the electrical grid system that can contribute in suitably stabilizing the electric power demand and supply balance of the electric power transmission and distribution facility.

In one aspect of the electrical grid system disclosed herein, said supply and demand satisfaction level calculation controller is configured to calculate said supply and demand satisfaction level from said electric storage amount with respect to said electric power supply request amount when said first obtaining controller obtains said information representing said electric power supply request amount as said electric power demand or supply request information, and said supply and demand satisfaction level calculation controller is configured to calculate said supply and demand satisfaction level from said free capacities with respect to the electric power demand request amount when said first obtaining controller obtains said electric power demand request amount.

According to the configuration described above, even when any one of the electric power supply request and the electric power demand request is requested from the electric power transmission and distribution facility, it is possible to promptly correspond to the request described above so as to suitably contribute in stabilizing the electric power demand and supply balance of the electric power transmission and distribution facility.

In one aspect of the electrical grid system disclosed herein, said selection controller is configured to previously store a first threshold for said supply and demand satisfaction level, and said selection controller is configured to select said electric vehicle to be guided to said charge or discharge spot based on said vehicle information obtained by said third obtaining controller when said supply and demand satisfaction level calculated by said supply and demand satisfaction level calculation controller and said first threshold are compared and then said supply and demand satisfaction level is lower than said first threshold.

According to the configuration described above, it is possible to guide the electric vehicle and to adjust the electric storage state of the charge or discharge spot with the electric vehicle at which the electric storage apparatus is disposed, when the supply and demand satisfaction level is lower than the first threshold. By doing this, it is possible to more suitably correspond to the electric power demand or supply request from the electric power transmission and distribution facility.

One aspect of the electrical grid system disclosed herein further includes a cooperation incentive calculation controller that is configured to calculate a cooperation incentive based on said supply and demand satisfaction level, said cooperation incentive is to be imparted to a user of said electric vehicle having performed charge or discharge at said charge or discharge spot, and said communication controller is configured to send said guide information containing an information related to said cooperation incentive calculated by said cooperation incentive calculation controller.

Here, the cooperation incentive is not particularly restricted, if it is an incentive that is calculated on the basis of the supply and demand satisfaction level to be additionally imparted so as to accelerate the user to participate in the electric power demand and supply adjustment. The incentive can be, for example, a coupon, a complimentary ticket, a discount of an electricity bill, or the like. By calculating the cooperation incentive based on the electric storage state as described above, it is possible to accelerate the user of the electric vehicle to perform charge or discharge at the timing when the charge or discharge is required. By doing this, it is possible to more suitably adjust the electric storage state of the charge or discharge spot, and it is possible to suitably correspond to the electric power demand or supply request from the electric power transmission and distribution facility.

In one aspect of the electrical grid system disclosed herein, said cooperation incentive calculation controller is configured to previously store a second threshold for said supply and demand satisfaction level, said second threshold is lower than said first threshold, and said cooperation incentive calculation controller is configured to calculate said cooperation incentive based on said supply and demand satisfaction level, when said supply and demand satisfaction level calculated by said supply and demand satisfaction level calculation controller and said second threshold are compared and said supply and demand satisfaction level is lower than said second threshold.

According to the configuration described above, it is configured to calculate the cooperation incentive when the supply and demand satisfaction level is particularly low, and thus it is possible to more surely adjust the electric storage state of the charge or discharge spot.

One aspect of the electrical grid system disclosed herein further includes an incentive managing controller that is configured to calculate an incentive to be imparted to a user who uses said electric vehicle having received said guide information, having been electrically connected to said electric storage apparatus, and having performed charge or discharge.

According to the configuration described above, the incentive is imparted to the user of the electric vehicle that performed charge or discharge in accordance with the guide information. By doing this, when the guide information was sent, in other words, when the supply and demand satisfaction level of the charge or discharge spot is low, it is possible to more suitably encourage the user to perform charge or discharge.

In one aspect of the electrical grid system disclosed herein, said vehicle information includes at least one among a SOC information of said electric vehicle, a current position information of said electric vehicle, and a correspondence rate with respect to said guide information.

According to the configuration described above, it is possible to suitably select the electric vehicle that is more easily guided.

Additionally, in another aspect, an electric power demand and supply adjusting method herein disclosed is provided. The herein disclosed electric power demand and supply adjusting method includes a step for obtaining an electric power demand or supply request information from an electric power transmission and distribution facility, a step for obtaining an electric storage state information from a charge or discharge spot at which an electric storage apparatus is disposed, a step for obtaining a vehicle information for an electric vehicle being electrically connected to said electric storage apparatus and being capable of performing charge or discharge, a step for calculating a supply and demand satisfaction level, based on said obtained electric power demand or supply request information and said electric storage state information, a step for selecting said electric vehicle to be guided to said charge or discharge spot, based on said obtained vehicle information and said calculated supply and demand satisfaction level, and a step for sending a guide information to said selected electric vehicle. Here, said electric power demand or supply request information is an information representing an electric power supply request amount or an electric power demand request amount, and said electric storage state information is an information representing an electric storage amount and free capacities of said charge or discharge spot.

According to the configuration described above, the electric power demand or supply request information of the electric power transmission and distribution facility and the electric storage state information of the charge or discharge spot provided with the storage battery are obtained, and the supply and demand satisfaction level is calculated on the basis of the information as described above. Then, in consideration of the calculated supply and demand satisfaction level and the vehicle information of the electric vehicle being capable of performing charge or discharge at the charge or discharge spot, it is possible to guide the electric vehicle to the charge or discharge spot and adjust the electric storage state of the charge or discharge spot. By doing this, it is possible to promptly correspond to the electric power demand or supply request from the electric power transmission and distribution facility, and it is possible to suitably contribute in stabilizing the electric power demand and supply balance of the electric power transmission and distribution facility.

In one aspect of the electric power demand and supply adjusting method herein disclosed, said supply and demand satisfaction level is calculated at said step for calculating said supply and demand satisfaction level from said electric storage amount with respect to said electric power supply request amount when said information representing said electric power supply request amount is obtained as said electric power demand or supply request information, and said supply and demand satisfaction level is calculated at said step for calculating said supply and demand satisfaction level from said free capacities with respect to said electric power demand request amount when the information representing said electric power demand request amount is obtained as said electric power demand or supply request information.

According to the configuration described above, even when any of the electric power supply request and the electric power demand request are requested from the electric power transmission and distribution facility, it is possible to perform an appropriate electric power demand and supply adjustment and thus it is possible to suitably contribute in stabilizing the electric power demand and supply balance of the electric power transmission and distribution facility.

In one aspect of the electric power demand and supply adjusting method herein disclosed, when said calculated supply and demand satisfaction level and a first threshold for said supply and demand satisfaction level are compared and then said supply and demand satisfaction level is lower than said first threshold at said step for selecting said electric vehicle, said electric vehicle to be guided to said charge or discharge spot is selected on a basis of said obtained vehicle information.

According to the configuration described above, it is possible to guide the electric vehicle when the supply and demand satisfaction level is lower than the first threshold, so as to use the electric vehicle and adjust the electric storage state of the charge or discharge spot provided with the storage battery. By doing this, it is possible to more suitably correspond to the electric power demand or supply request from the electric power transmission and distribution facility.

One aspect of the electric power demand and supply adjusting method herein disclosed further includes a step for calculating a cooperation incentive to be imparted to a user of said electric vehicle having performed charge or discharge at said charge or discharge spot, based on said supply and demand satisfaction level, and at said step for sending said guide information, said guide information including an information related to said calculated cooperation incentive is sent.

According to the configuration described above, the cooperation incentive to be imparted to the user of the electric vehicle having performed charge or discharge is calculated on the basis of the supply and demand satisfaction level, and thus it is possible to precisely accelerate the user of the electric vehicle to perform charge or discharge when the supply and demand satisfaction level is low. By doing this, it is possible to more suitably adjust the electric storage state of the charge or discharge spot and it is possible to suitably correspond to the electric power demand or supply request from the electric power transmission and distribution facility.

In one aspect of the electric power demand and supply adjusting method herein disclosed, when said calculated supply and demand satisfaction level and a second threshold being lower than said first threshold for the supply demand satisfaction level are compared and then said supply and demand satisfaction level is lower than said second threshold, said cooperation incentive based on said supply and demand satisfaction level is calculated at said step for calculating said cooperation incentive.

According to the configuration described above, it is configured to calculate the cooperation incentive when the supply and demand satisfaction level is particularly low, and thus it is possible to more surely adjust the electric storage state of the charge or discharge spot.

One aspect of the electric power demand and supply adjusting method herein disclosed further includes a step for calculating an incentive to be imparted to a use of said electric vehicle having received said guide information, having been electrically connected to said electric storage apparatus, and having performed charge or discharge.

According to the configuration described above, the incentive is imparted to the user of the electric vehicle that performed charge or discharge in accordance with the guide information. By doing this, when the guide information was sent, in other words, when the supply and demand satisfaction level of the charge or discharge spot is low, it is possible to more suitably encourage the user to perform charge or discharge.

In one aspect of the electric power demand and supply adjusting method herein disclosed, said vehicle information includes at least one among a SOC information of said electric vehicle, a current position information of said electric vehicle, and a correspondence rate to said guide information.

According to the configuration described above, it is possible to select the electric vehicle that is more easily guided.

BRIEF DESCRIPTION OF THE DRAWINGS

FIG. 5A shows a case where an electric storage amount is more than the electric power supply request amount. FIG. 5B shows a case where the electric storage amount is less than the electric power supply request amount.

FIG. 6A shows a case where free capacities are more than the electric power demand request amount. FIG. 6B shows a case where the free capacities are less than the electric power demand request amount.

DETAILED DESCRIPTION

Below, while referring to drawings, one embodiment of a herein disclosed electrical grid system will be explained. Incidentally, a matter not described in the present specification but required for performing the present disclosure can be grasped as a design matter of those skilled in the art based on the related art in the present field. The embodiment explained herein is not particularly intended to restrict the present disclosure. The present disclosure is not restricted by the here explained embodiment, unless specifically mentioned. In addition, members or portions having the same effect are suitably provided with the same reference sign, and overlapped explanation will be suitably omitted.

Figure 1:
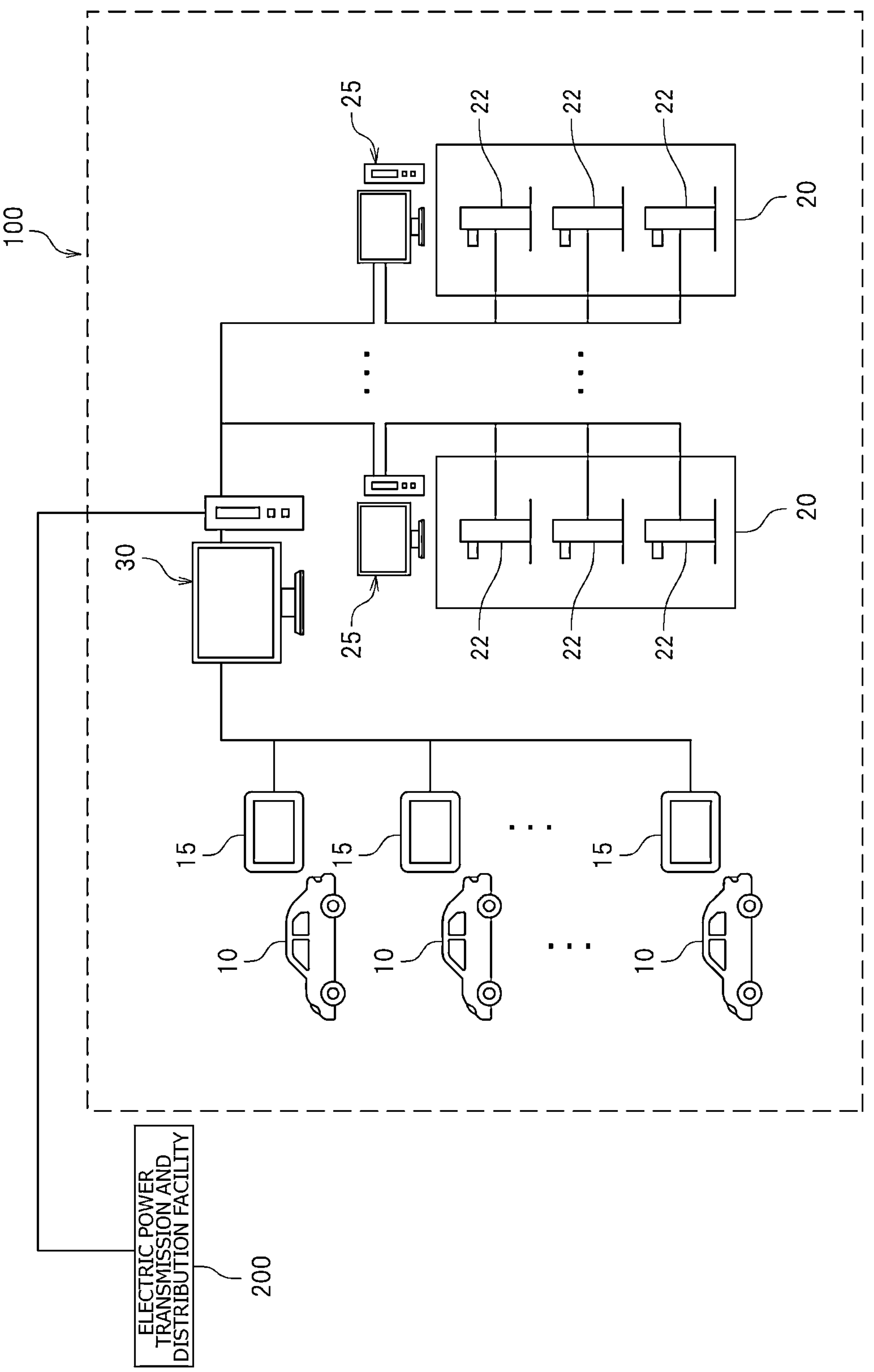
FIG. 1 is a conceptual view that shows an electrical grid system in accordance with one embodiment.

FIG. 1 is a conceptual view that shows a herein disclosed electrical grid system. The electrical grid system 100 herein disclosed is a system that uses an electric vehicle 10 so as to adjust an electric storage state of a charge or discharge spot 20, in order to promptly respond to an electric power demand or supply request of an electric power transmission and distribution facility 200. The charge or discharge spot 20 is provided with at least one electric storage apparatus 22. The electrical grid system 100 manages supplying (here, electrically charging) electric power stored by the electric storage apparatus 22 to an electric vehicle 10 while the electric vehicle 10 and the electric storage apparatus 22 are electrically connected, and manages supplying (here, electrically discharging) electric power from the electric vehicle 10 to the electric storage apparatus 22, so as to correspond to an electric power demand or supply request from the electric power transmission and distribution facility 200. Regarding the herein disclosed technique, by providing the electric storage apparatus 22 to the charge or discharge spot 20, it is possible to adjust the electric storage state of the charge or discharge spot 20 based on a supply and demand satisfaction level described later.

The electrical grid system 100 is implemented, for example, with a client server system. However, the electrical grid system 100 might be implemented with cloud computing.

The electric vehicle 10 is a vehicle whose energy source is electric power. The electric vehicle 10 is one kind of transportation equipments, and might be a four-wheeled vehicle or a two-wheeled vehicle. The electric vehicle 10 might be a battery electric vehicle (BEV) including a storage battery as a driving source, or might be a hybrid electric vehicle (HEV) including the storage battery and an internal combustion engine as the driving source. Incidentally, a term "hybrid vehicle" in the present specification semantically covers a plug-in hybrid electric vehicle (PHEV) that includes a charge apparatus charging from a stationary power supply to a storage battery. It is preferable that the electric vehicle 10 includes a control apparatus (ECU: Electronic Control Unit) for an electric system that can measure SOC (state of charge) of the storage battery, or the like.

The ECU manages various states of the storage battery mounted on the vehicle. In order to manage the state of the storage battery, the ECU includes a voltage sensor, a current sensor, a temperature sensor, or the like, which are not shown in figures. As a signal required for managing the storage battery, for example, an inter-terminal voltage from the voltage sensor, a charge or discharge current from the current sensor, a battery temperature from the temperature sensor, or the like is input into and stored by the ECU. The ECU can measure a SOC state of the storage battery of the electric vehicle 10, based on the input signal.

Regarding a user terminal 15, It is enough that the user terminal is configured to be able to perform a bidirectional communication with a resource aggregator 30. The user terminal 15 might be, for example, a car navigation system mounted on the electric vehicle 10, or might be a smart phone, a tablet terminal, or a desktop type or laptop type of a personal computer used by a user.

The charge or discharge spot 20 could be, for example, a car parking area in which an electric storage apparatus 22 is disposed. The car parking area is not particularly restricted, and could be, for example, a car parking area of a store that sells goods, a car parking area of a store that provides a service, such as a beauty salon, a car parking area of a large commercial facility, a car parking area of a house, or the like. Here, the electric storage apparatus 22 is an apparatus that is electrically connected to the electric vehicle 10 or the like, so as to store electric power, which is electrically discharged from the electric vehicle 10 or the like, into the electric storage apparatus 22, or so as to electrically discharge the electric power, which is stored by the electric storage apparatus 22, to the electric vehicle 10 or the like. The electric storage apparatus 22 is not particularly restricted, if the electric storage apparatus can be electrically connected to the electric vehicle 10 or the like, so as to store the electric power. The electric storage apparatus 22 might be, for example, a charge or discharge apparatus including a storage battery.

The electric storage apparatus 22 is disposed at the charge or discharge spot 20, as described above. The number of electric storage apparatuses 22 disposed at one charge or discharge spot 20 is not particularly restricted. In other words, one or a plurality of electric storage apparatuses 22 are disposed at one charge or discharge spot 20. Each of the charge or discharge spots 20 is managed by the charge or discharge spot management apparatus 25. One or a plurality of electric storage apparatuses 22 disposed at one charge or discharge spot 20 are managed by the same charge or discharge spot management apparatus 25.

The resource aggregator 30 here is to manage the electrical grid system 100. The resource aggregator 30 is connected in a communication capable manner to the user terminal 15, the electric power transmission and distribution facility 200, and the charge or discharge spot management apparatus 25, and is to manage information from the user terminal 15, the electric power transmission and distribution facility 200, and the charge or discharge spot management apparatus 25, all at once. The resource aggregator 30 might be implemented with a single computer, or might be implemented with cooperation of plural computers.

The resource aggregator 30 controls a supply and demand amount of electric power so as to manage the electric storage state of the charge or discharge spot 20, in order to respond the electric power demand or supply request from the electric power transmission and distribution facility 200. For example, when having obtained an electric power supply request from the electric power transmission and distribution facility 200, the resource aggregator 30 purveys the electric power and thus increases the electric storage amount of the electric storage apparatus 22. Alternatively, when having obtained an electric power demand request of the electric power transmission and distribution facility 200, the resource aggregator 30 makes the outside demand the electric power and thus reduces the electric storage amount of the electric storage apparatus 22. For example, in the electrical grid system 100, one or a plurality of users are registered, each of who uses or possesses the electric vehicles 10, and one or a plurality of charge or discharge spot management apparatuses 25 are registered, each of which is for the electric vehicle 10 performing charge or discharge, while the electric vehicle 10 itself or the electric storage apparatus 22 itself might be registered in the electrical grid system 100. The electrical grid system 100 supplies electric power from the electric storage apparatus 22 to the electric vehicle 10 (here, electric charge) or supplies electric power from the electric vehicle 10 to the electric storage apparatus 22 (here, electric discharge), in order to respond to the electric power demand or supply request from the electric power transmission and distribution facility, so as to adjust the electric storage state of the charge or discharge spot 20 and to manage the electric power.

Incidentally, the electric power transmission and distribution facility 200 is a facility that, to the electric power consumption facility, supplies electric power supplied from an electrical power station capable of supplying the electric power to the electric power transmission and distribution facility 200. Here, the electrical power station could be a facility including a conventionally known power generating equipment for, such as, thermal power, wind power, hydraulic power, nuclear power, and sunlight. In addition, the electric power consumption facility could be a facility, for example, a house, a commercial facility, a factory, a school, or the like.

Figure 2:
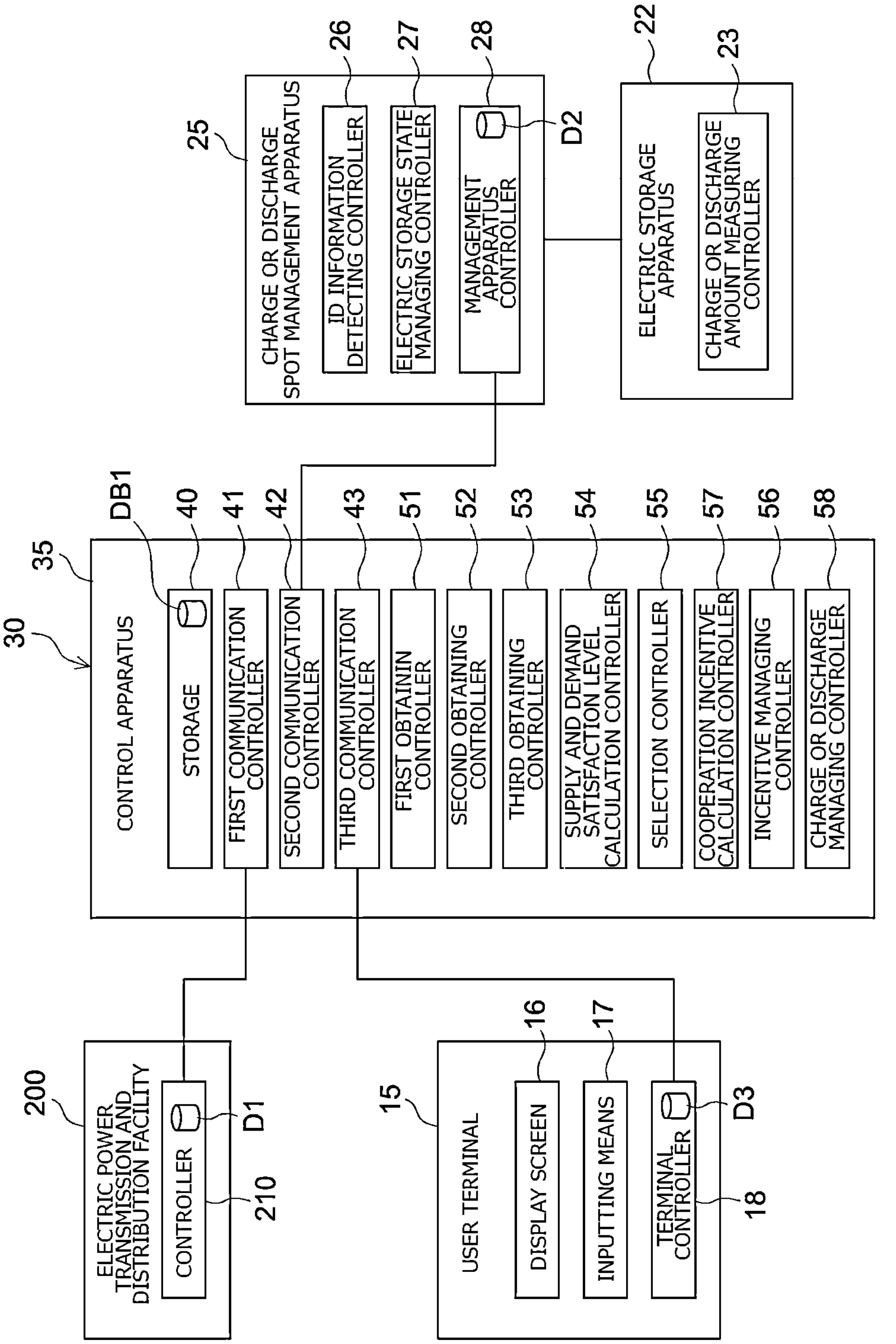
FIG. 2 is a block diagram that shows a resource aggregator, an electric power transmission and distribution facility, a user terminal, and a charge or discharge spot management apparatus, in accordance with one embodiment.

Next, an example of a particular configuration of the herein disclosed electrical grid system 100 will be described. FIG. 2 is a block diagram that shows the resource aggregator 30, or the like. As shown in FIG. 2, the resource aggregator 30 includes a control apparatus 35. The configuration of the control apparatus 35 is not particularly restricted. Here, for example, the control apparatus 35 includes a ROM (read only memory) that stores a program for performing a control, a central calculation processing apparatus (central processing unit: CPU) that can execute the program, a RAM (random access memory) that is used as a working area on which the program is developed, a storage apparatus that consists of a memory, or the like, storing the above-described program or various data, and an input/output port.

The control apparatus 35 of the herein disclosed electrical grid system 100 includes a first obtaining controller 51, a second obtaining controller 52, a third obtaining controller 53, a supply and demand satisfaction level calculation controller 54, and a selection controller 55. Additionally, the control apparatus 35 includes, in addition to respective parts 51 to 55, a storage 40, a first communication controller 41, a second communication controller 42, a third communication controller 43, an incentive managing controller 56, a cooperation incentive calculation controller 57, and a charge or discharge managing controller 58. Each of the parts 40 to 58 configuring the control apparatus 35 might be implemented with one or a plurality of processors, or might be incorporated into a circuit.

The first communication controller 41 is configured in a communication capable manner with the electric power transmission and distribution facility 200. The electric power transmission and distribution facility 200 includes at least a controller 210 that can communicate with the first communication controller 41. Here, the first communication controller 41 is, for example, connected in a communication capable manner with the controller 210 included by the electric power transmission and distribution facility 200.

The controller 210 previously stores an electric power demand or supply request information D1 for the electric power transmission and distribution facility 200. The electric power demand or supply request information D1 is an information that represents an electric power supply request amount or an electric power demand request amount. When a shortage of the electric power in the electric power transmission and distribution facility 200 is expected, the electric power supply request amount is sent from the electric power transmission and distribution facility 200 and the resource aggregator 30 obtains the electric power supply request amount. On the other hand, when it is expected that extra electric power appears in the electric power transmission and distribution facility 200, the electric power demand request amount is sent from the electric power transmission and distribution facility 200 and the resource aggregator 30 obtains the electric power demand request amount. Here, the electric power supply request amount or the electric power demand request amount of the electric power transmission and distribution facility 200 might be calculated, for example, on the basis of the real-time electric power demand and supply balance of the electric power transmission and distribution facility 200, or on the basis of a predictive value for the X-hours-later electric power demand and supply balance. It is preferable that the calculation is performed on the basis of the predictive value for the X-hours-later electric power demand and supply balance. Incidentally, the electric power demand and supply balance might be calculated on the basis of various informations directly or indirectly inducing effects on the electric power demand and supply balance, such as a weather information and an event information, in addition to the electric power amount of the electric power transmission and distribution facility 200 itself.

The second communication controller 42 is configured in a communication capable manner with the charge or discharge spot management apparatus 25 that manages the charge or discharge spot 20. The charge or discharge spot management apparatus 25 includes an ID information detecting controller 26, an electric storage state managing controller 27, and a management apparatus controller 28. The management apparatus controller 28 is connected to the ID information detecting controller 26 and the electric storage state managing controller 27 in a communication capable manner. Here, the second communication controller 42 is connected to the management apparatus controller 28 of the charge or discharge spot management apparatus 25 in a communication capable manner.

The ID information detecting controller 26 obtains a vehicle ID of the electric vehicle 10 that was electrically connected to the electric storage apparatus 22 and that performed charge or discharge, and obtains a user ID of a user who uses (possesses) the electric vehicle 10 (below, collectively referred to as "ID information"). The electric storage state managing controller 27 manages the electric storage state of the charge or discharge spot 20. More particularly, the electric storage state managing part manages the electric storage states of one or a plurality of electric storage apparatuses 22 disposed at the charge or discharge spot 20. In addition, it is preferable that the electric storage state managing controller 27 stores a predetermined maximum electric storage possible amount for the charge or discharge spot 20. Incidentally, the maximum electric storage possible amount means an electric storage amount at the time when all of one or a plurality of electric storage apparatuses 22 disposed at the charge or discharge spot 20 are in full-charge states.

In addition, the charge or discharge spot management apparatus 25 is connected in a communication capable manner to one or a plurality of electric storage apparatuses 22 disposed at the charge or discharge spot 20. The electric storage apparatus 22 includes a charge or discharge amount measuring controller 23. The charge or discharge amount measuring controller 23 measures an electric power amount (charge or discharge amount) which was charged or discharged by the electric vehicle 10 electrically connected to the electric storage apparatus 22. Incidentally, here, the electric power amount (charge amount) which was charged by the electric vehicle 10 means an electric power amount having been supplied from the electric power transmission and distribution facility 200 to the electric vehicle 10. On the other hand, the electric power amount (discharge amount) which was discharged by the electric vehicle 10 means an electric power amount having been supplied from the electric vehicle 10 to the electric power transmission and distribution facility 200.

The management apparatus controller 28 previously stores an electric storage state information D2. Here, the electric storage state information D2 contains an electric storage amount and free capacities of one or a plurality of electric storage apparatuses 22 disposed at the charge or discharge spot 20. The electric storage amount and the free capacities of the electric storage apparatus 22 can be obtained (estimated), for example, from the SOC of the storage battery included by the electric storage apparatus 22. A method for obtaining (estimating) the SOC is not particularly restricted. As an example, a rough value for the SOC might be obtained (estimated) by comparing a voltage of the storage battery, measured by a voltage sensor, with a SOC-OCV curve. Incidentally, the OCV (Open Circuit Voltage) means a voltage of a secondary battery at a not-energizing time, and is referred to as an open circuit voltage, too.

The third communication controller 43 is configured in a communication capable manner with the user terminal 15 of the user who uses (possesses) the electric vehicle 10. The third communication controller 43 is an example of the communication controller of the herein disclosed electrical grid system 100. The third communication controller 43 is configured to send a guide information D4 to the user terminal 15 based on an instruction from a later-described selection controller 55.

The user terminal 15 includes a display screen 16, an inputting means 17, such as a touch panel, a keyboard, or a mouse, which is operated by the user to input, and a terminal controller 18. The terminal controller 18 is connected in a communication capable manner to the display screen 16 and the inputting means 17. Here, the third communication controller 43 is connected in a communication capable manner to the terminal controller 18 of the user terminal 15.

The user terminal 15 previously stores a vehicle information D3 of the electric vehicle 10. The vehicle information D3 is an information related to the electric vehicle 10 that is electrically connected to the electric storage apparatus 22 and that is capable of performing charge or discharge. The vehicle information D3 contains at least one among the SOC information of the electric vehicle 10, a current position information of the electric vehicle 10, and a correspondence rate to a later-described guide information D4. The vehicle information D3 might contain, for example, a scheduled travel distance of the electric vehicle 10, a SOC remaining capacity designated by the user of the electric vehicle 10, or the like, other than the above-described information. It is preferable that the vehicle information D3 contains a plurality of above-described informations.

The first obtaining controller 51 obtains the above-described electric power demand or supply request information D1. The electric power demand or supply request information D1 is previously stored in the controller 210 of the electric power transmission and distribution facility 200. Thus, the first obtaining controller 51 obtains the electric power demand or supply request information D1 via the first communication controller 41.

The second obtaining controller 52 obtains the electric storage state information D2 of the charge or discharge spot 20 at which the electric storage apparatus 22 is disposed. As described above, the electric storage state information D2 is previously stored in the management apparatus controller 28. Thus, the second obtaining controller 52 obtains the electric storage state information D2 via the second communication controller 42.

The third obtaining controller 53 obtains the vehicle information D3 of the electric vehicle 10 that is electrically connected to the electric storage apparatus 22 and is capable of performing charge or discharge. The vehicle information D3 is previously stored in the terminal controller 18. Thus, the third obtaining controller 53 obtains the vehicle information D3 via the third communication controller 43.

The supply and demand satisfaction level calculation controller 54 calculates the supply and demand satisfaction level based on the electric power demand or supply request information D1 obtained by the above-described first obtaining controller 51 and the electric storage state information D2 obtained by the second obtaining controller 52. The supply and demand satisfaction level is calculated on the basis of the electric storage state of the charge or discharge spot 20 (electric storage amount and free capacities) with respect to the electric power demand or supply request amount from the electric power transmission and distribution facility 200. For example, in a case where the electric storage amount of the charge or discharge spot 20 with respect to the electric power demand request amount from the electric power transmission and distribution facility 200 is sufficiently large, the supply and demand satisfaction level is in a higher state. On the other hand, in a case where the electric storage amount of the charge or discharge spot 20 with respect to the electric power demand request amount from the electric power transmission and distribution facility 200 is small, the supply and demand satisfaction level is in a lower state. In other words, the supply and demand satisfaction level is a parameter representing an extent at which it is possible to correspond to the electric power demand or supply request from the electric power transmission and distribution facility 200 by the electric storage state of the charge or discharge spot 20. Incidentally, a particular method for calculating the supply and demand satisfaction level will be described later.

The selection controller 55 selects the electric vehicle 10 to be guided to the charge or discharge spot 20, based on the vehicle information D3 obtained by the third obtaining controller 53 and the supply and demand satisfaction level calculated by the supply and demand satisfaction level calculation controller 54. Then, the third communication controller 43 is instructed to send the guide information D4 to the selected electric vehicle 10. Here, the guide information D4 is an information for guiding the electric vehicle 10 to the charge or discharge spot 20. It is preferable that the guide information D4 contains, for example, a position information of the charge or discharge spot 20, a use situation of the charge or discharge spot 20, a road information to the charge or discharge spot 20, or the like. In addition, the guide information D4 might contain an information related to a cooperation incentive described later.

The selection controller 55 might previously stores a first threshold for the supply and demand satisfaction level. It is preferable that the selection controller 55 is configured to select the electric vehicle 10 to be guided to the charge or discharge spot 20 based on the vehicle information D3 obtained by the third obtaining controller 53, when the supply and demand satisfaction level calculated by the supply and demand satisfaction level calculation controller 54 and the above-described first threshold is compared and then the supply and demand satisfaction level is lower than the first threshold. According to the configuration described above, when the supply and demand satisfaction level is low, it is possible to guide the electric vehicle 10 to the charge or discharge spot 20 so as to perform charge or discharge of the electric power. By doing this, it is possible to adjust the electric storage state information of the charge or discharge spot 20 so as to promptly satisfy the electric power demand or supply request from the electric power transmission and distribution facility 200.

The incentive managing controller 56 receives the guide information D4, calculates the incentive imparted to the user whose electric vehicle 10 was electrically connected to the electric storage apparatus 22 and performed charge or discharge, and then imparts the incentive to the user. The incentive is not particularly restricted and might be, for example, a coupon, a complimentary ticket, a discount for an electricity bill, or the like. Particularly, the coupon might be a coupon that can charge an extra for a bill obtained when electric discharge is performed from the electric vehicle 10, or might be a coupon that can discount the bill obtained when electric charge is performed on the electric vehicle 10. In addition, the incentive might be exchanged with goods or might give a right to take a predetermined bonus. Furthermore, in a case where the charge or discharge spot 20 is a car parking area of a commercial facility, the incentive might give a right for discount on the commercial facility of the charge or discharge spot 20 or might be used instead of money for goods purchase.

The incentive might be, for example, calculated on the basis of the charge or discharge amount, or might be calculated on the basis of the charge or discharge amount and the supply and demand satisfaction level. In one aspect of the incentive managing controller 56, it is preferable for the user of the electric vehicle 10, on which charge or discharge was performed when the supply and demand satisfaction level was low, that the electric power selling price is configured to be set higher or the electric power buying price is configured to be set lower than a case where the supply and demand satisfaction level is higher.

The cooperation incentive calculation controller 57 calculates the cooperation incentive based on the supply and demand satisfaction level, the cooperation incentive being to be imparted to the user of the electric vehicle 10 which was electrically connected to the electric storage apparatus 22 and on which charge or discharge was performed. Here, the cooperation incentive is an incentive that is calculated on the basis of the supply and demand satisfaction level and then additionally imparted together with the above-described incentive calculated by the incentive managing controller 56. The cooperation incentive is not particularly restricted, if the cooperation incentive is to encourage the user to participate in the electric power demand and supply adjustment. For example, the cooperation incentive might be the above-described coupon, complimentary ticket, discount for electricity bill, or the like. The incentive calculated by the cooperation incentive calculation controller 57 is set on the basis of the supply and demand satisfaction level, and thus it is possible to reflect the electric storage state of the charge or discharge spot 20 in real time. Incidentally, it is configured that, when the cooperation incentive is calculated by the cooperation incentive calculation controller 57, the cooperation incentive is imparted to the user together with the incentive calculated by the incentive managing controller 56.

In one aspect, the cooperation incentive calculation controller 57 stores a second threshold that is lower than the first threshold for the supply and demand satisfaction level. The cooperation incentive calculation controller 57 might be configured to calculate the cooperation incentive when the supply and demand satisfaction level calculated by the supply and demand satisfaction level calculation controller 54 is lower than the second threshold. According to the configuration described above, the cooperation incentive is calculated when the supply and demand satisfaction level is particularly low, and thus it is possible to effectively encourage the user of the electric vehicle 10 to participate in the electric power demand and supply adjustment.

According to the electrical grid system 100 including the above-described configurations, the supply and demand satisfaction level is calculated on the basis of the electric power demand or supply request information D1 of the electric power transmission and distribution facility 200 and the electric storage state information D2 of the charge or discharge spot 20, and then the electric vehicle 10 to be guided is selected on the basis of the supply and demand satisfaction level and the vehicle information D3 of the electric vehicle 10. Thus, it is possible to adjust the electric storage state of the charge or discharge spot 20 with the electric vehicle 10 based on the supply and demand satisfaction level, and to promptly supply or demand the electric power when the electric power demand or supply request came from the electric power transmission and distribution facility 200. By doing this, it is possible to more suitably contribute in stabilizing the electric power demand and supply balance of the electric power transmission and distribution facility 200.

Figure 3:
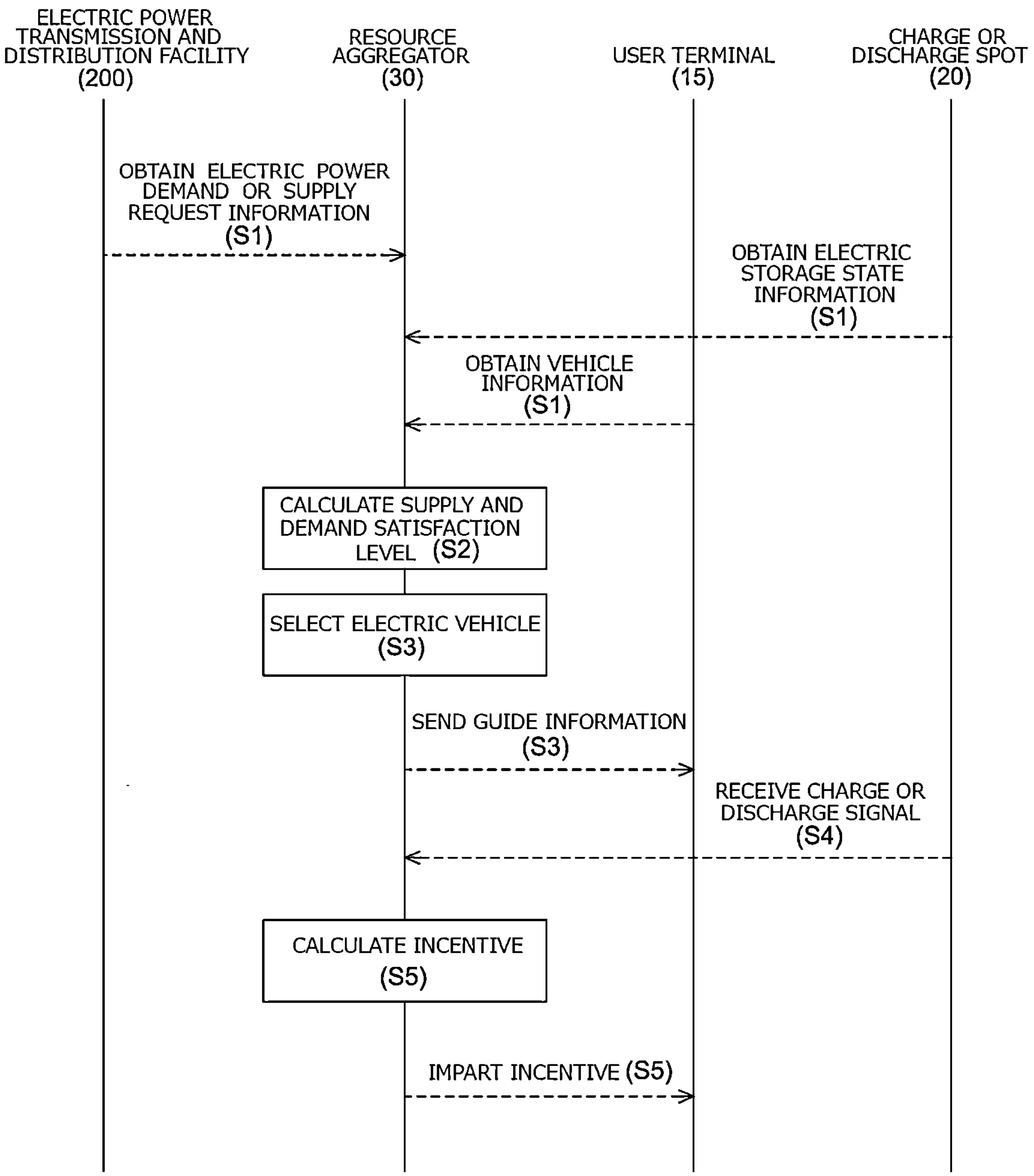
FIG. 3 is a sequence diagram that is to explain an example of a processing procedure of the electrical grid system in accordance with one embodiment.

Next, an electric power demand and supply processing performed with the configuration shown in FIG. 1 and FIG. 2 will be described. FIG. 3 is a sequence diagram that shows the electric power demand and supply processing performed for adjusting the electric storage state of the charge or discharge spot 20 with the electric vehicle 10.

As shown in FIG. 3, the resource aggregator 30 obtains an electric power demand or supply request information from the electric power transmission and distribution facility 200, an electric storage state information from the charge or discharge spot 20, and a vehicle information from the user terminal 15 (S1). The resource aggregator 30 calculates the supply and demand satisfaction level based on the electric power demand or supply request information and the electric storage state information (S2). Next, the resource aggregator 30 selects the electric vehicle 10, which is to be guided to the charge or discharge spot 20, based on the obtained vehicle information and the calculated supply and demand satisfaction level. The resource aggregator 30 sends the guide information to the user terminal 15 of the user of the selected electric vehicle 10 (S3). The user of the electric vehicle 10, who confirmed the guide information and decided to participate in the electric power demand and supply processing, makes the electric vehicle 10 used by the user move to the charge or discharge spot 20 and then electrically connects the electric vehicle to the electric storage apparatus 22. The resource aggregator 30 receives a charge or discharge signal from the electric storage apparatus 22 and then confirms that charge or discharge was performed (S4). The resource aggregator 30 receives the guide information, calculates the incentive to be imparted to the user of the electric vehicle 10 that performed charge or discharge, and then performs imparting (S5). By doing this kind of processing, the herein disclosed electric power demand and supply adjustment is implemented.

Figure 4:
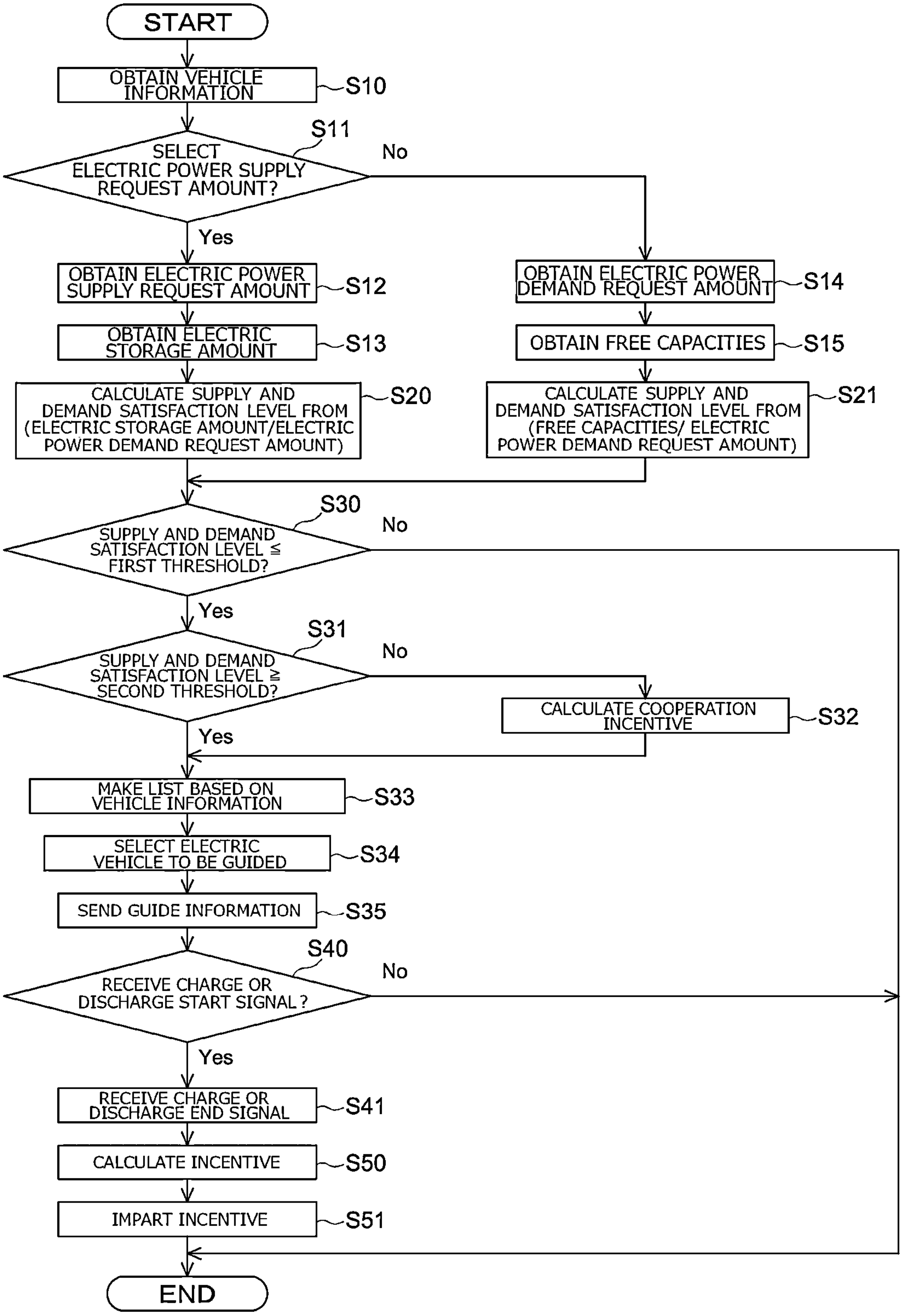
FIG. 4 is a flowchart diagram that shows the processing procedure of the electrical grid system in accordance with one embodiment.

Next, the above-described steps S1 to S5 in FIG. 3 are described in details with FIG. 4. FIG. 4 is a flowchart diagram for the herein disclosed electric power demand and supply adjustment. The herein disclosed electrical grid system 100 performs the steps S1 to S5 of FIG. 3 as described below, in order to adjust the electric storage state information of the charge or discharge spot 20 based on the supply and demand satisfaction level and to contribute in stabilizing the electric power demand and supply balance of the electric power transmission and distribution facility 200.

At S1 of FIG. 3, it performs steps S10 to S15 of FIG. 4. At step S10, the third obtaining controller 53 of FIG. 2 obtains the vehicle information D3. The vehicle information D3 obtained here is an information related to the electric vehicle 10 that is electrically connected to the electric storage apparatus 22 and is capable of performing charge or discharge, as described above.

At step S11, the first obtaining controller 51 of FIG. 2 decides whether or not selecting the electric power supply request amount as the electric power demand or supply request information from the electric power transmission and distribution facility 200. When it selected the electric power supply request amount (S11: YES), it proceeds to step S12. At step S12, the first obtaining controller 51 obtains the electric power supply request amount. Next, at step S13, the second obtaining controller 52 obtains the electric storage amount as the electric storage state information D2.

On the other hand, when it does not select the electric power supply request amount (S11: NO), it proceeds to step S14. At step S14, the first obtaining controller 51 of FIG. 2 obtains the electric power demand request amount. Next, at step S15, the second obtaining controller 52 obtains the free capacities as the electric storage state information D2.

At S2 of FIG. 3, it performs steps S20 and S21 of FIG. 4. At steps S20 and S21, the supply and demand satisfaction level calculation controller 54 of FIG. 2 calculates the supply and demand satisfaction level, based on the obtained electric power demand or supply request information D1 and electric storage state information D2 described above.

Figure 5A:
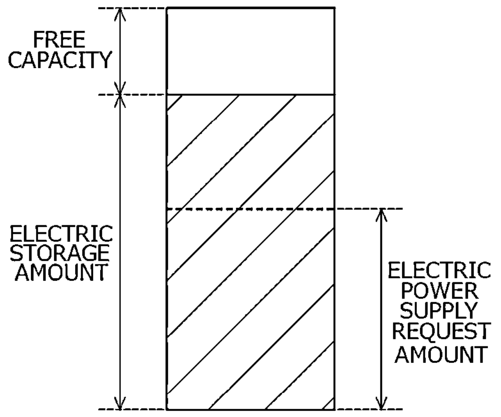
FIG. 5A and FIG. 5B are schematic views that are to explain about a supply and demand satisfaction level in a case where an electric power supply request amount has been obtained.
Figure 5B:
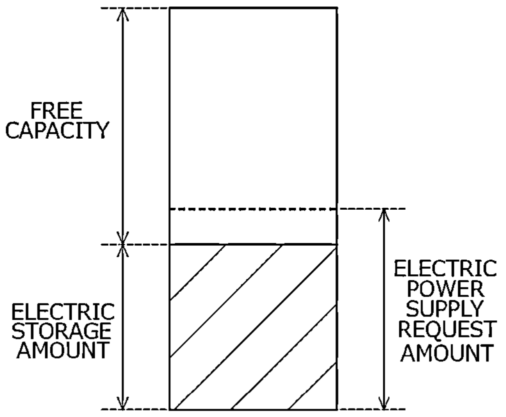

At step S20, the supply and demand satisfaction level is calculated as the electric storage amount with respect to the electric power supply request amount. For example, as shown in FIG. 5A, when the electric storage amount is large with respect to the electric power supply request amount, it is possible to satisfy the electric power supply request amount from the electric power transmission and distribution facility 200 by the electric storage amount of the charge or discharge spot 20. Thus, the supply and demand satisfaction level is in a higher state. On the other hand, as shown in FIG. 5B, when the electric storage amount is small with respect to the electric power supply request amount, it is not possible to satisfy the electric power supply request amount from the electric power transmission and distribution facility 200 by the electric storage amount of the charge or discharge spot 20. Thus, the supply and demand satisfaction level is in a lower state.

Figure 6A:
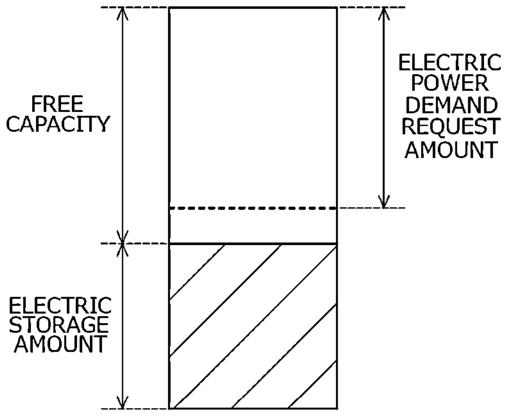
FIG. 6A and FIG. 6B are schematic views that are for explaining about a supply and demand satisfaction level in a case where the electric power demand request amount has been obtained.
Figure 6B:
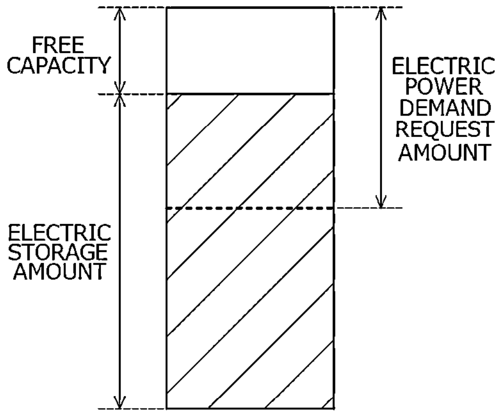

On the other hand, at step S21, the supply and demand satisfaction level is calculated as free capacities with respect to the electric power demand request amount. For example, as shown in FIG. 6A, when the free capacities are large with respect to the electric power demand request amount, it is possible to receive the electric power demand request amount corresponding to the free capacities of the charge or discharge spot 20 from the electric power transmission and distribution facility 200. Thus, the supply and demand satisfaction level is in a higher state. On the other hand, as shown in FIG. 6B, when the free capacities are small with respect to the electric power demand request amount, it is not possible to sufficiently receive the electric power demand request amount from the electric power transmission and distribution facility 200. Thus, the supply and demand satisfaction level is in a lower state.

Therefore, by adjusting the electric storage state of the charge or discharge spot 20 based on the supply and demand satisfaction level, it is possible to promptly respond to the electric power demand or supply request from the electric power transmission and distribution facility 200.

At S3 of FIG. 3, it performs steps S30 to S35 of FIG. 4. At step S30 and steps S33 to S35, the selection controller 55 of FIG. 2 selects a vehicle to be guided to the charge or discharge spot 20, based on the calculated supply and demand satisfaction level and vehicle information D3 described above.

At step S30, the selection controller 55 of FIG. 2 compares the calculated supply and demand satisfaction level described above and the previously stored first threshold for the supply and demand satisfaction level. When the calculated supply and demand satisfaction level described above is low, it is afraid that the electric storage state of the charge or discharge spot 20 can not satisfy the electric power demand or supply request amount from the electric power transmission and distribution facility 200. Therefore, it is necessary that the electric vehicle 10, or the like, is used to perform charge or discharge of the electric power, so as to adjust the electric storage state of the charge or discharge spot 20. When the supply and demand satisfaction level is lower than the first threshold (step S30: YES), it proceeds to step S31. On the other hand, when the supply and demand satisfaction level is not lower than the first threshold (step S30: NO), it ends the electric power demand and supply processing.

Anyway, in order to more actively guide the user of the electric vehicle 10 to the charge or discharge spot 20, for example, it is possible to calculate the incentive so as to encourage performing charge or discharge to the charge or discharge spot 20. Thus, in one aspect of the electric power demand and supply adjusting method herein disclosed, it is configured to calculate the cooperation incentive for more actively guiding the user of the electric vehicle 10 to the charge or discharge spot 20. In particular, at step S31, the cooperation incentive calculation controller 57 of FIG. 2 is configured to store the second threshold that is lower than the first threshold for the supply and demand satisfaction level, and compares the supply and demand satisfaction level calculated at step S20 or S21 and the second threshold. Here, when the supply and demand satisfaction level is not higher than the second threshold (step S31: NO), it proceeds to step S32.

At step S32, the cooperation incentive calculation controller 57 calculates the cooperation incentive, based on the supply and demand satisfaction level. It is preferable that the cooperation incentive is configured to be calculated from an incentive imparting rate based on the supply and demand satisfaction level. The incentive imparting rate is a coefficient that is used for calculating the incentive to be imparted. As the incentive imparting rate is higher, the incentive given to the user, such as a coupon and a point, is increased more. It is preferable that, for example, the incentive imparting rate is set to be higher as the supply and demand satisfaction level is lower.

According to the configuration described above, in a situation where the supply and demand satisfaction level is particularly low and the electric storage state of the charge or discharge spot 20 is hardly adjusted to a range capable of satisfying the electric power demand or supply request amount from the electric power transmission and distribution facility 200, it is possible to more actively guide the user of the electric vehicle 10 to the charge or discharge spot 20.

The cooperation incentive to be calculated might be configured to correspond to a temporal change in the supply and demand satisfaction level after the guide information D4 is sent at step S35 described later. The supply and demand satisfaction level becomes lower as charge or discharge is performed more between the electric storage apparatus 22 and the electric vehicle 10. In other words, in the case where the guide information D4 was sent to a plurality of electric vehicles 10, the user of the electric vehicle 10, which was electrically connected at the earliest time to the electric storage apparatus 22 and sent the charge or discharge signal, can be treated as one who performed charge or discharge when the supply and demand satisfaction level was the highest. It is expected that a user, who wants to obtain more incentives, performs charge or discharge when the supply and demand satisfaction level is higher, in other words, at an earlier stage since the guide information D4 was sent. Therefore, by reflecting on the cooperation incentive the temporal change in the supply and demand satisfaction level since the guide information D4 was sent, it is possible to satisfy the supply and demand satisfaction level in a shorter time.

On the other hand, when the supply and demand satisfaction level is higher than the second threshold (step S31: YES), it proceeds to step S33. Incidentally, the first threshold and the second threshold are varied on the basis of a timing at which the electric power demand or supply request information is obtained, a position of the charge or discharge spot 20, or the like, and thus cannot be defined simply, but it is preferable that, for example, arbitrary values are set in reference to an average charge or discharge amount of the charge or discharge spot 20 or an average correspondence rate for the guide information D4.

At step S33 of FIG. 4, the selection controller 55 of FIG. 2 makes a list for the electric vehicles, based on the vehicle information D3 obtained by the third obtaining controller 53. For example, the selection controller 55 might make a list based on a SOC information of the electric vehicles 10 in which the electric vehicles are arranged in a SOC higher order or SOC lower order of the storage batteries mounted on the electric vehicles 10. In addition, based on current position informations of the electric vehicles 10, the selection controller 55 might make a list in which the electric vehicles are arranged in a closer order of distance from the charge or discharge spot 20 or might make a list in which the electric vehicles are arranged in a higher order of correspondence rate of the electric vehicle 10 to the guide information D4. Alternatively, all of above-described three elements might be used as parameters and then arbitrary weighting might be performed so as to make a list.

Incidentally, the correspondence rate to the guide information D4 is a value calculated on the basis of number, with respect to the number of having sent the guide information D4, by which response was performed to actually implement electrical connection to the electric storage apparatus 22 so as to implement performing charge or discharge.

At step S34, the selection controller 55 selects the electric vehicle 10 to be guided to the charge or discharge spot 20. For example, it is preferable to set a reference value in the made list as described above and to configure to select the electric vehicle 10 which is higher than the reference value. Here, the reference value might be, for example, set with the SOC of the electric vehicle 10. When the electric storage amount of the charge or discharge spot 20 is in shortage, the possibility of taking larger supply of electric power is higher by guiding the electric vehicle 10 whose SOC is higher, and thus it is preferable. On the other hand, when the free capacities of the charge or discharge spot 20 are in shortage, the possibility of taking larger demand of the electric power is higher by guiding the electric vehicle 10 whose SOC is lower, and thus it is preferable. Therefore, by using the SOC as the reference value, it is possible to more efficiently improve the electric storage state of the charge or discharge spot 20.

The reference value might be, for example, set with a distance between the charge or discharge spot 20 and the electric vehicle 10. In other words, when the distance between the obtained current position information of the electric vehicle 10 and the charge or discharge spot 20 being the object is too long, the possibility that the selected electric vehicle 10, even if selected as the electric vehicle to be guided, is guided to the charge or discharge spot 20 is too low. Therefore, by using the distance between the charge or discharge spot 20 and the electric vehicle 10 as the reference value, the selection controller 55 can more surely select the electric vehicle 10 capable of being guided to the charge or discharge spot 20.

In addition, the reference value might be set with the correspondence rate to the guide information D4. It is possible to assume that the user of the electric vehicle 10, whose correspondence rate to the guide information D4 is higher, is cooperative to the electric power demand and supply adjustment better than the user of the electric vehicle 10 whose correspondence rate to the guide information D4 is lower. It is estimated that, when the electric vehicle 10 whose correspondence rate to the guide information D4 is higher is selected as the electric vehicle 10 to be guided to the charge or discharge spot 20, the possibility of performing charge or discharge becomes higher. Therefore, by using the correspondence rate to the guide information D4 as the reference value, the selection controller 55 can more surely select the electric vehicle 10 capable of being guided to the charge or discharge spot 20.

At step S35, based on an instruction from the selection controller 55 of FIG. 2, the third communication controller 43 sends the guide information D4 to the selected electric vehicle 10 described above. The guide information D4 sent here is an information for guiding the electric vehicle 10 to the charge or discharge spot 20. The guide information D4 as described above might contain an information related to the cooperation incentive calculated at step S32.

It is preferable that the guide information D4 having been sent is configured to be displayed on a display screen 16 of the user terminal 15. Particularly, it is preferable, for example, that an information related to a matter representing which of charge and discharge is accepted and a list table of available charge or discharge spots 20, distances from the user's current position to the charge or discharge spots 20, or the like are configured to be displayed. Incidentally, the available charge or discharge spot 20 means a state where the electric storage apparatus 22 disposed at the charge or discharge spot 20 is not in use. The above-described list table might have a function of performing rearrangement based on a distance order or the like. When confirming the presented guide information D4 and then performing charge or discharge, the user operates the inputting means 17 so as to send the ID information from the user terminal 15 to the resource aggregator 30. At that time, an additional information, such as the charge or discharge spot 20 which wants to perform charge or discharge and the charge or discharge amount wanted by the user, might be associated with the ID information and be sent together.

At S4 of FIG. 3, steps S40 and S41 of FIG. 4 are performed. At step S40, the charge or discharge managing controller 58 of FIG. 2 decides whether the charge or discharge start signal was received or not. The user confirms the presented guide information D4 described above, and then drives the electric vehicle 10 to the charge or discharge spot 20. Then, when the user arrived at the charge or discharge spot 20, the vehicle is electrically connected to the electric storage apparatus 22 and charge or discharge is started. Here, when the electric storage apparatus 22 and the electric vehicle 10 were electrically connected and then charge or discharge was started, a charge or discharge start signal is sent from the charge or discharge spot management apparatus 25 to the charge or discharge managing controller 58 via the second communication controller 42. By making the charge or discharge managing controller 58 receive the charge or discharge start signal, it is possible to determine that charge or discharge was started. When the resource aggregator 30 received the charge or discharge start signal (step S40: YES), it proceeds to step S41. When the resource aggregator 30 does not receive the charge or discharge start signal even a predetermined time later (step S40: NO), it ends the electric power demand and supply processing. Here, the predetermined time is not particularly restricted, but might be suitably set about 30 minutes to 10 hours after the third communication controller 43 sent the guide information D4 to the user terminal 15.

Next, when it ends the charge or discharge, the charge or discharge end signal is sent from the charge or discharge spot management apparatus 25 to the charge or discharge managing controller 58 via the second communication controller 42. At step S41, by making the charge or discharge managing controller 58 receive the charge or discharge end signal, it determines the end of charge or discharge. At that time, the charge or discharge amount measured by the charge or discharge amount measuring controller 23 of FIG. 2 is associated with the electric vehicle 10 obtained by the ID information detecting controller 26 and with the ID information of the user of this vehicle and then stored in the management apparatus controller 28. The charge or discharge managing controller 58 can be configured to obtain the ID information via the second communication controller 42 and the charge or discharge amount associated with this ID information. By doing this, the resource aggregator 30 can receive the guide information D4 and specify the user who performed charge or discharge at the charge or discharge spot 20.

At S5 of FIG. 3, it performs steps S50 and S51 of FIG. 4. At step S50, the incentive managing controller 56 of FIG. 2 receives the guide information D4 and calculates the incentive to be imparted to the user whose electric vehicle 10 was electrically connected to the electric storage apparatus 22 and was subjected to charge or discharge. The incentive herein might be calculated from the charge or discharge amount obtained by the charge or discharge managing controller 58 as described above, or might be configured to be calculated from the supply and demand satisfaction level calculated by the supply and demand satisfaction level calculation controller 54 and the charge or discharge amount.

Next, at step S51, the incentive managing controller 56 of FIG. 2 imparts the calculated incentive to the user. Here, imparting the incentive is, for example, to associate the vehicle ID and the incentive so as to register the incentive for the user of the electric vehicle 10 in the data base DB1 stored by the storage 40. However, for example, in a case where the incentive can be electronically exchanged, such as an electronic coupon, sending the electronic coupon or the like to the user terminal 15 might be treated as imparting the incentive.

Incidentally, in a case where the cooperation incentive calculation controller 57 calculated the cooperation incentive at step S32, it is configured to impart the cooperation incentive together with the incentive calculated at step S50 to the user.

As described above, by calculating the supply and demand satisfaction level based on the electric power demand or supply request information, on the electric storage state information, and on the vehicle information, and by performing the electric power demand and supply adjustment based on the supply and demand satisfaction level, it is possible to implement the electric power demand and supply adjustment in consideration of the electric power demand or supply request from the electric power transmission and distribution facility 200 and the electric storage state of the charge or discharge spot 20. By adjusting the electric storage state of the charge or discharge spot 20 based on the supply and demand satisfaction level as described above, it is possible to promptly correspond to the electric power demand or supply request from the electric power transmission and distribution facility 200. By doing this, it is possible to more suitably contribute in stabilizing the electric power demand and supply balance of the electric power transmission and distribution facility 200.

Above, the specific example of the present disclosure has been described in details, but these descriptions are merely illustrative and are not construed as limiting the scope of the appended claims. The technique recited in claims contains matters in which the above-illustrated specific example is variously deformed or changed.

What is claimed is:

1. An electrical grid system, comprising:

a first obtaining controller configured to obtain an electric power demand or supply request information from an electric power transmission and distribution facility;

a second obtaining controller configured to obtain an electric storage state information from a charge or discharge spot at which an electric storage apparatus is disposed;

a third obtaining controller configured to obtain a vehicle information of an electric vehicle which is electrically connected to the electric storage apparatus and is capable of performing charge or discharge;

a supply and demand satisfaction level calculation controller configured to calculate a supply and demand satisfaction level, based on the electric power demand or supply request information obtained by the first obtaining controller and the electric storage state information obtained by the second obtaining controller;

a cooperation incentive calculation controller configured to calculate a cooperation incentive to be imparted to a user of the electric vehicle, based on the supply and demand satisfaction level;

a selection controller configured to select an electric vehicle to be guided to the charge or discharge spot based on the vehicle information obtained by the third obtaining controller and the supply and demand satisfaction level calculated by the supply and demand satisfaction level calculation controller;

a communication controller configured to send a guide information to the selected electric vehicle, the guide information containing information related to the cooperation incentive calculated by the cooperation incentive calculation controller; and a charge or discharge managing controller configured to receive a charge or discharge start signal from the charge or discharge spot when the electric vehicle is electrically connected to the electric storage apparatus and charge or discharge is started, to thereby control and manage the charging or discharging operation, wherein, here, the electric power demand or supply request information is an information representing an electric power supply request amount or an electric power demand request amount, and the electric storage state information is an information representing an electric storage amount and free capacities of the charge or discharge spot.

2. The electrical grid system according to claim 1, wherein the supply and demand satisfaction level calculation controller is configured to calculate the supply and demand satisfaction level from the electric storage amount with respect to the electric power supply request amount when the first obtaining controller obtains an information representing the electric power supply request amount as the electric power demand or supply request information, and the supply and demand satisfaction level calculation controller is configured to calculate the supply and demand satisfaction level from the free capacities with respect to the electric power demand request amount when the first obtaining controller obtains the electric power demand request amount.

3. The electrical grid system according to claim 1, further comprising an incentive managing controller configured to calculate an incentive to be imparted to a user who uses the electric vehicle having received the guide information, having been electrically connected to the electric storage apparatus, and having performed charge or discharge.

4. The electrical grid system according to claim 1, wherein the vehicle information comprises at least one among a SOC information of the electric vehicle, and a current position information of the electric vehicle.

5. The electrical grid system according to claim 1, wherein the selection controller is configured to previously store a first threshold for the supply and demand satisfaction level, and the selection controller is configured to select the electric vehicle to be guided to the charge or discharge spot based on the vehicle information obtained by the third obtaining controller, when the supply and demand satisfaction level calculated by the supply and demand satisfaction level calculation controller and the first threshold are compared and the supply and demand satisfaction level is lower than the first threshold.

6. The electrical grid system according to claim 5, wherein the cooperation incentive calculation controller is configured to previously store a second threshold for the supply and demand satisfaction level, the second threshold being lower than the first threshold, and the cooperation incentive calculation controller is configured to calculate the cooperation incentive based on the supply and demand satisfaction level, when the supply and demand satisfaction level calculated by the supply and demand satisfaction level calculation controller and the second threshold are compared and the supply and demand satisfaction level is lower than the second threshold.

7. An electric power demand and supply adjusting method, comprising:

a step for obtaining an electric power demand or supply request information from an electric power transmission and distribution facility;

a step for obtaining an electric storage state information from a charge or discharge spot at which an electric storage apparatus is disposed;

a step for obtaining a vehicle information for an electric vehicle being electrically connected to the electric storage apparatus and being capable of performing charge or discharge;

a step for calculating a supply and demand satisfaction level, based on the obtained electric power demand or supply request information and the electric storage state information;

a step for calculating a cooperation incentive to be imparted to a user of the electric vehicle, based on the supply and demand satisfaction level;

a step for selecting the electric vehicle to be guided to the charge or discharge spot, based on the obtained vehicle information and the calculated supply and demand satisfaction level;

a step for sending a guide information to the selected electric vehicle, the guide information comprising an information related to the calculated cooperation incentive; and a step for managing the performance of charge or discharge of the selected electric vehicle by receiving a charge or discharge start signal from the charge or discharge spot after the selected electric vehicle is electrically connected to the electric storage apparatus in response to the guide information, wherein, here, the electric power demand or supply request information is an information representing an electric power supply request amount or an electric power demand request amount, and the electric storage state information is an information representing an electric storage amount and free capacities of the charge or discharge spot.

8. The electric power demand and supply adjusting method according to claim 7, wherein, when the information representing the electric power supply request amount is obtained as the electric power demand or supply request information, the supply and demand satisfaction level is calculated at the step for calculating the supply and demand satisfaction level from the electric storage amount with respect to the electric power supply request amount, and when the information representing the electric power demand request amount is obtained as the electric power demand or supply request information, the supply and demand satisfaction level is calculated at the step for calculating the supply and demand satisfaction level from the free capacities with respect to the electric power demand request amount.

9. The electric power demand and supply adjusting method according to claim 7, further comprising a step for calculating an incentive to be imparted to a use of the electric vehicle having received the guide information, having been electrically connected to the electric storage apparatus, and having performed charge or discharge.

10. The electric power demand and supply adjusting method according to claim 7, wherein the vehicle information comprises at least one among a SOC information of the electric vehicle, and a current position information of the electric vehicle.

11. The electric power demand and supply adjusting method according to claim 7, wherein when the calculated supply and demand satisfaction level and a first threshold for the supply and demand satisfaction level are compared and then the supply and demand satisfaction level is lower than the first threshold at the step for selecting the electric vehicle, the electric vehicle to be guided to the charge or discharge spot is selected on a basis of the obtained vehicle information.

12. The electric power demand and supply adjusting method according to claim 11, wherein, when the calculated supply and demand satisfaction level and a second threshold being lower than the first threshold for the supply demand satisfaction level are compared and then the supply and demand satisfaction level is lower than the second threshold, the cooperation incentive based on the supply and demand satisfaction level is calculated at the step for calculating the cooperation incentive.

* * * * *